US012811613B1

(12) United States Patent
Gok et al.

(10) Patent No.: US 12,811,613 B1
(45) Date of Patent: Nov. 24, 2026

(54) RF SWITCH MATRIX ARCHITECTURE

(71) Applicant: Rockwell Collins, Inc., Cedar Rapids, IA (US)

(72) Inventors: Gurkan Gok, Milford, CT (US); Joseph Zacchio, Wethersfield, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 296 days.

(21) Appl. No.: 18/440,610

(22) Filed: Feb. 13, 2024

(51) Int. Cl.

| | |
|---|---|
| ***H04B 1/00*** | (2006.01) |
| ***H01P 5/04*** | (2006.01) |
| ***H01P 5/12*** | (2006.01) |
| ***H04J 13/00*** | (2011.01) |

(52) U.S. Cl.
CPC ............... *H04B 1/006* (2013.01); *H01P 5/04* (2013.01); *H01P 5/12* (2013.01); *H04J 13/004* (2013.01)

(58) Field of Classification Search
CPC .. H04B 1/006; H04B 1/44; H01P 5/04; H01P 5/12; H04J 13/004
See application file for complete search history.

(56) References Cited

U.S. PATENT DOCUMENTS

| | | | | |
|---|---|---|---|---|
| 6,642,908 | B2 * | 11/2003 | Pleva | G01S 7/0232 343/876 |
| 7,424,039 | B2 | 9/2008 | Deane et al. | |
| 10,862,567 | B2 | 12/2020 | Li et al. | |
| 2013/0252562 | A1 | 9/2013 | Hasson et al. | |
| 2014/0227982 | A1 | 8/2014 | Granger-Jones et al. | |

FOREIGN PATENT DOCUMENTS

| | | |
|---|---|---|
| CN | 115327484 A | 11/2022 |

* cited by examiner

*Primary Examiner* — Tuan H Nguyen
(74) *Attorney, Agent, or Firm* — Suiter Swantz IP

(57) ABSTRACT

A system for radio frequency (RF) switching is disclosed. The system may include an RF switch matrix coupled between one or more input ports and configured to selectively output an output signal using selected output ports of two or more output ports. The RF switch matrix may include a power divider, a plurality of phase shifters, and a combiner. In some embodiments, the selected output ports are based on phase shifting performed by the phase shifters.

20 Claims, 5 Drawing Sheets

300

HADAMARD MATRIX (N = 4)

302

$$\bar{H}_4 = \frac{1}{\sqrt{4}} \begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

FIG. 3B

RF SWITCH MATRIX ARCHITECTURE

TECHNICAL FIELD

The present disclosure relates generally to radio frequency (RF) switches configured to route RF signals, and, more particularly, to waveguide RF switch matrices.

BACKGROUND

RF switches (e.g., aircraft cabin RF switches) are used extensively in systems for signal routing between components and/or subsystems. Semiconductor-based, electronically-controlled RF switches may be used due to their potential simple reconfigurability, fast response, and efficiency. While state-of-the-art RF switches over time have exhibited improved power handling ability, adequate higher power RF switch solutions for values in the kilowatts or higher are not necessarily available.

The industry may benefit from an RF switch matrix system and method that improves upon one or more of these issues.

SUMMARY

A system for radio frequency (RF) switching is disclosed in accordance with one or more illustrative embodiments of the present disclosure. In one illustrative embodiment, the system may include one or more input ports configured to receive an input signal and two or more output ports. In another illustrative embodiment, an RF switch matrix may be coupled between the one or more input ports and the two or more output ports and configured to selectively couple one or more of the one or more input ports to one or more selected output ports of the two or more output ports. In another illustrative embodiment, the RF switch matrix may include a power divider coupled to the one or more input ports and configured to split the input signal into a plurality of power divider output signals. In another illustrative embodiment, a plurality of phase shifters may be coupled to the power divider and configured to output a plurality of phase shift output signals, where each phase shifter is configured to receive a power divider output signal and output a phase shift output signal. In another illustrative embodiment, a combiner may be coupled to the plurality of phase shifters and include combiner input ports and coupled to the two or more output ports, the combiner configured to receive the plurality of phase shift output signals via the combiner input ports and to selectively output an output signal via the one or more selected output ports of the two or more output ports.

In a further aspect, the outputting of the plurality of phase shift output signals may be configured to impress a code on the plurality of phase shift output signals, where the code is configured to uniquely correspond to the one or more selected output ports, and the selective outputting of the output signal via the one or more selected output ports is based on the code. In another aspect, the code may be configured to be impressed by a set of control signals via a set of control lines coupled to the plurality of phase shifters. In another aspect, the plurality of phase shifters may comprise a plurality of binary phase shifters, each binary phase shifter configured to selectively perform an electronically controlled polarization rotation corresponding to a 180 degree phase rotation, where the impressing of the code comprises the selective performing of the electronically controlled polarization rotation. In another aspect, the one or more selected output ports may comprise a single selected output port, where the combiner is configured to focus the plurality of phase shift output signals to the single selected output port based on the code. In another aspect, the code may comprise a Hadamard code and the combiner may include a Hadamard decoder configured to perform a Hadamard transform based on the Hadamard code. In another aspect, the combiner may be passive such that the selective outputting of the output signal is passively selected based on the code.

In another aspect, one or more of the one or more input ports of the RF switch matrix may comprise a single input port, and the one or more selected output ports of the two or more output ports of the RF switch matrix may comprise a single selected output port of the two or more output ports. In another aspect, the system may comprise a waveguide implementation of the RF switch matrix, the one or more input ports, and the two or more output ports. In another aspect, the RF matrix may be at least one of: integrated onto a single chip; or implemented on a printed circuit board (PCB). In another aspect, the system may further include a Luneburg lens coupled to the output ports. In another aspect, the plurality of the power divider output signals may be configured to have equal amplitude and phase.

A system for radio frequency (RF) switching is disclosed in accordance with one or more illustrative embodiments of the present disclosure. In one illustrative embodiment, the system may include a controller configured to execute program instructions stored on memory, which includes a code. In another illustrative embodiment, the system may include one or more input ports configured to receive an input signal and two or more output ports. In another illustrative embodiment, the system may include an RF switch matrix coupled to the controller via a set of control lines, the controller coupled between the input ports and the output ports and configured to selectively couple one or more of the input ports to one or more selected output ports.

In another illustrative embodiment, the RF switch matrix may include a power divider coupled to the input ports and configured to split the input signal into a plurality of power divider output signals. In another illustrative embodiment, the RF switch matrix may include a plurality of phase shifters coupled to the power divider and configured to output a plurality of phase shift output signals, where each phase shifter is configured to receive a power divider output signal and output a phase shift output signal. In another illustrative embodiment, the RF switch matrix may include a combiner coupled to the phase shifters and comprising combiner input ports and coupled to the output ports, the combiner configured to receive the phase shift output signals via the combiner input ports and to selectively output an output signal via the selected output ports.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

FIG. 3B is a view of a N equal to 4 Hadamard matrix, in accordance with one or more embodiments of the present disclosure.

DETAILED DESCRIPTION

Figure 1:
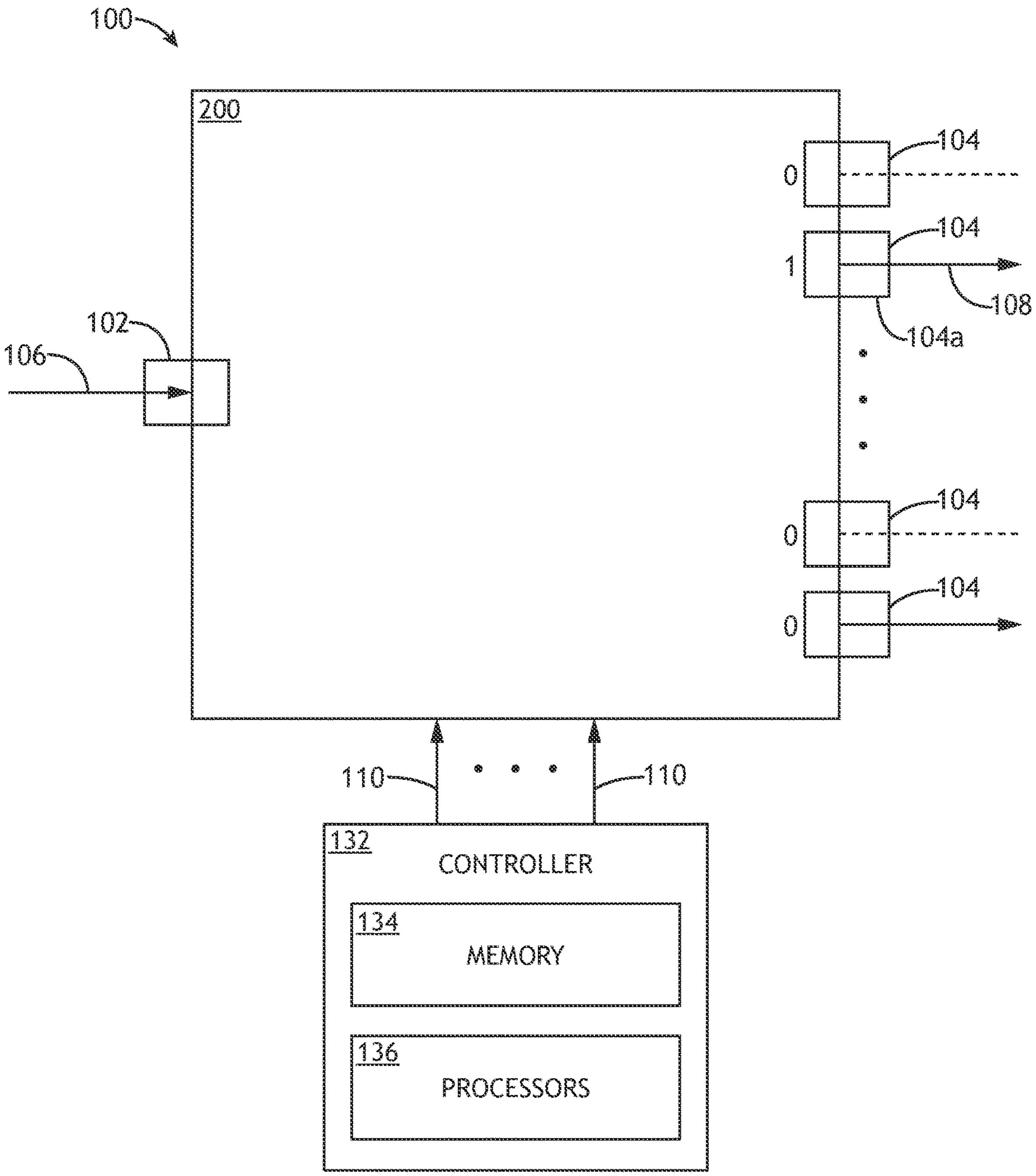
FIG. 1 is a simplified conceptual diagram of a system including an RF switch matrix, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, embodiments disclosed herein are directed to a system and method including a radio frequency (RF) switch matrix for routing RF signals by utilizing a power divider, phase shifters, and a combiner. In one or more embodiments, the system may enable high power (e.g., two or more kilowatts) input signal routing to a desired output port. In one or more embodiments (e.g., the same one or more embodiments), the phase shifters are binary phase shifters for impressing a code (e.g., Hadamard code) onto equal-power divided input signals received from the power divider by selectively shifting the phase of some of the divided input signals. In one or more embodiments, the combiner is a multi-port, passive, lossless microwave network configured to combine and focus the output from the phase shifters to a desired output port. For example, the combiner may be a decoder (e.g., Hadamard) configured to perform unitary linear transformations on the phase shifter outputs such that the phase shifter outputs are combined and output at the desired output port according to the code impressed upon the phase shifter outputs. The system may be configured to perform sequentially for pairing a sequence of input signals to a sequence of output ports. This approach provides a flexible solution to handle large power signals while maintaining low signal loss and high isolation between ports. This system can be used in a wide range of applications, providing significant benefits in terms of signal routing efficiency, signal integrity, and system performance.

The system may be implemented in various systems, such as in telecommunication systems, radar systems, satellite communication systems, and/or any other RF signal processing systems. For example, the system may be used for various applications such as, but not limited to, a transmitting antenna, beamforming, and/or the like. The use of binary phase shifters and a decoder in the system may allow for precise control of the phase of the input signals, enabling the routing of signals to specific output ports with high accuracy and reliability. The system may provide for improved power handling, improved routing efficiency, reduced distortion, and enhanced signal integrity.

FIG. 1 illustrates a simplified conceptual diagram of a system 100 for radio frequency (RF) switching including an RF switch matrix 200, in accordance with one or more embodiments of the present disclosure.

In embodiments, the system 100 includes one or more input ports 102 to receive an input signal 106 (e.g., a single input signal 106 via the single input port 102, multiple input signals 106—one for each input port 102, and/or the like). The input ports may be considered separate or a part of an RF switch matrix 200 of the system 100. In some embodiments, the system 100 includes two or more input ports 102 (e.g., any number). In some embodiments, the system 100 includes a single input port 102.

In embodiments, the system 100 includes two or more output ports 104. For example, the system 100 may be configured to selectively output an output signal 108 to a selected output port 104*a* (e.g., desired port). The output signal 108 may be the same and/or similar to (e.g., a derivative of) the input signal 106. In this way, the system 100 may route an input signal 106 to any of the output ports 104. In some embodiments, the system 100 includes any number of output ports 104 (e.g., 1, 2, 4, 8, 16, 32, 64, and/or the like). For example, the system 100 may include sixteen output ports 104 and a single input port 102.

In embodiments, the system 100 includes an RF switch matrix 200 coupled between the input port 102 and the output ports 104 and configured to selectively couple one or more of the one or more input ports to one or more selected output ports 104*a* of the two or more output ports 104. For example, the selected output port 104*a* may be a single selected output port 104*a*. For example, the selected output port 104*a* may be two or more selected output ports 104*a*.

In embodiments, the system 100 includes a controller 132. The controller 132 may be used for controlling the operation of the phase shifters (e.g., phase shifters 118 of FIG. 2), such as may be controlled by control lines 110. In this way, the controller 132 may be configured to control the phase shifting of input signals divided by a power divider. In embodiments, the system 100 (and/or the controller 132) may include a memory 134 for storing a code (e.g., Hadamard or any other code) used for phase shifting. The memory 134 may be configured to store a plurality of codes, and the controller 132 (and/or processor 136) may be configured to select a code from the memory 134 based on a desired output port 104*a*.

Figure 2:
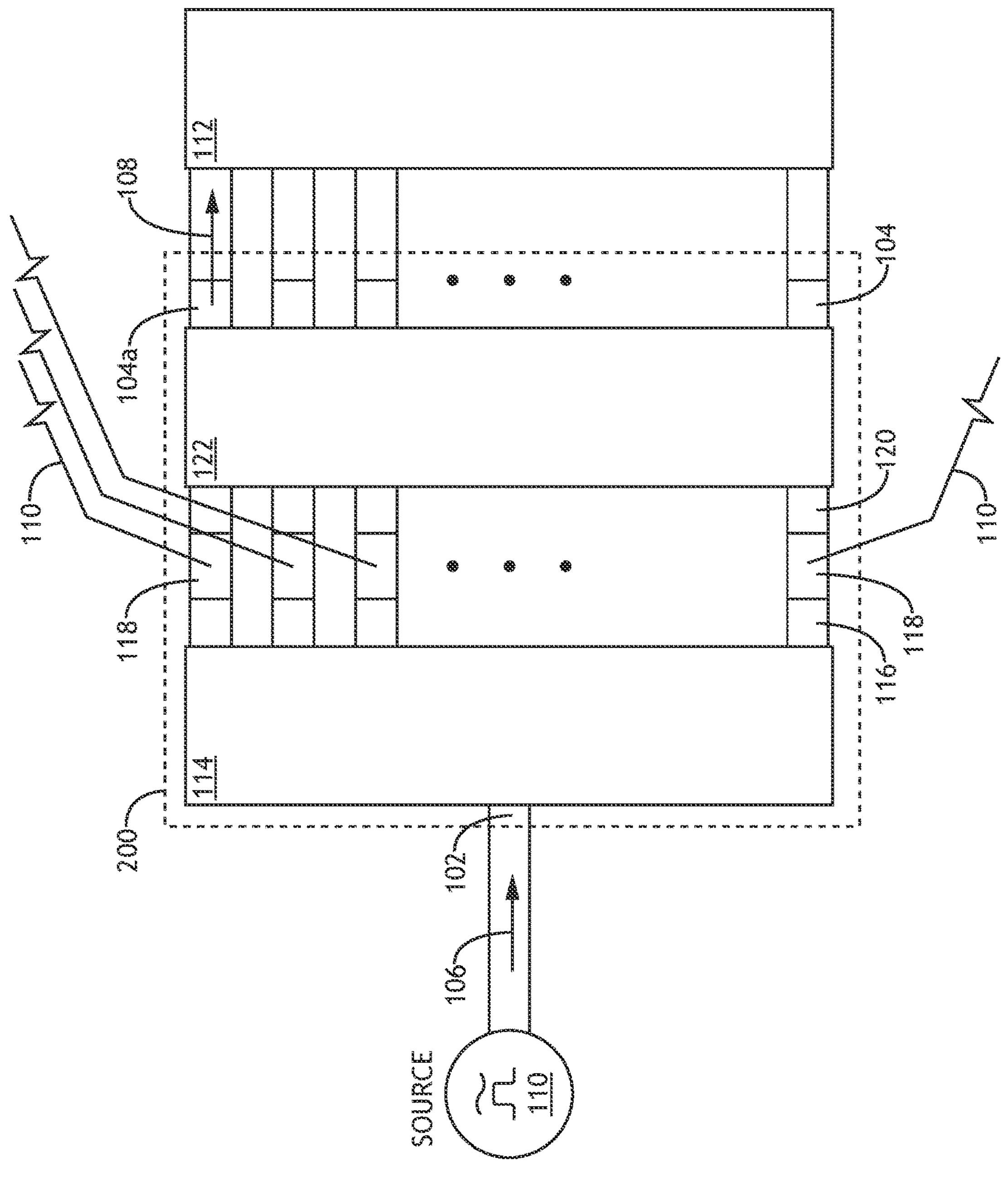
FIG. 2 is a conceptual diagram of a system including an RF switch matrix and various components, in accordance with one or more embodiments of the present disclosure.

FIG. 2 illustrates a conceptual diagram of a system 100 including an RF switch matrix 200 and various components, in accordance with one or more embodiments of the present disclosure.

In embodiments, the RF switch matrix 200 includes a power divider 114. The power divider 114 may be coupled to the input port 102. The power divider 114 may couple the input port 102 to the power divider output ports 116. The power divider 114 may be configured to split the input signal 106 into power divider output signals which are output at the power divider output ports 116. For example, each power divider output signal may be individually output at each power divider output port 116. The power divider output signals may be split equally such that they are configured to have equal power (e.g., equal amplitude, equal phase, equal amplitude and phase, and/or the like).

The RF switch matrix 200 includes phase shifters 118. The phase shifters 118 may be coupled to the power divider 114 and configured to output phase shift output signals. Each phase shifter 118 may be configured to receive a power divider output signal and output a phase shift output signal. As shown, each phase shifter 118 may be coupled (electronically) to a control line 110 (e.g., electrically conductive material) of a set of control lines 110 configured to impress the code. For instance, each control line 110 may be configured to selectively activate (e.g., electrically charge, and/or the like) via electrical power of a control signal a phase shifter 118 to perform a phase shift to a signal passing through. For instance, for illustrative purposes only, for a 16-bit code of 1111000010100101 (e.g., just an example code and not necessarily illustrative of a particular Hadamard code), which may be stored on memory 134, eight of the phase shifters may be activated by controller 132 in a corresponding configuration (e.g., in the order given) so as to impress the code (e.g., binary code sequence) to the eight phase shifters of sixteen phase shifters 118. A code may be indicative of a selection of one of a selected output port 104*a*.

The phase shifters 118 may be any phase shifter. For example, the phase shifter 118 may include (and/or be) a binary phase shifter. It is contemplated that a binary phase shifter may allow for especially efficient, low-cost, and/or simplified implementation of the system 100. Each phase shifter 118 may be configured to selectively perform an electronically controlled polarization rotation. For example, each binary phase shifter 118 may selectively perform an electronically controlled polarization rotation (e.g., +90 degrees, −90 degrees, and/or the like) corresponding to a 180 degree phase rotation. In this way, the phase shifters 118 may impress the code by the selective performing of the electronically controlled polarization rotations.

The RF switch matrix 200 includes a combiner 122. The combiner 122 may be configured (e.g., designed, constructed, and/or the like) to passively combine and focus the phase shift output signals such that the coded phases of the phase shift output signals deterministically result in which output port 104 is output to. The combiner 122 may be coupled to the phase shifters 118. The combiner 122 may include combiner input ports 120. The combiner 122 may be coupled to the output ports 104. The combiner 122 may be configured to receive the phase shift output signals using the combiner input ports 120 and to selectively output an output signal 108 using a (e.g., a single one, one or more, two or more, and/or the like) selected output port 104*a*.

As noted, the outputting of the plurality of phase shift output signals may be configured to impress a code on the plurality of phase shift output signals. The code may be configured to uniquely correspond to a selected output port 104*a*. The selective outputting (by the combiner 122) of the output signal 108 via the selected output ports 104 may be based on the code. This may be a passive process based on the code (actively) impressed by the phase shifters 118. For example, the combiner 122 may include a multi-port, passive, lossless microwave network configured to combine and focus the phase shift output signals to the desired output port 104*a*. For example, the combiner 122 may be or include a decoder (e.g., Hadamard decoder) configured to perform unitary linear transformations on the phase shift output signals such that the phase shift output signals are combined and output at the desired output port 104*a* according to the code impressed upon the phase shift output signals. For instance, the combiner 122 may be passive such that the selective outputting (i.e., rather than non-selective outputting to all ports) of the output signal 108 (to a selected output port 104*a*) is passively selected (e.g., performed without any type of active electronic control signals directed to the combiner 122) based on the code.

The system 100 may be (or alternatively include) a waveguide implementation (e.g., configured as an RF waveguide or a combination of RF waveguides). For example, the RF switch matrix 200 may include a waveguide implementation including a set of interconnected waveguides with waveguide ports. For instance, the RF switch matrix 200 may include a parallel plate waveguide for the power divider 114, and/or the combiner 122. The phase shifters 118 may be waveguides configured to be electronically controlled to shift the phase of a wave/signal. For example, the input port 102, power divider output ports 116, combiner input ports 120, and output ports 104 may be waveguide ports (configured to direct RF waves). For example, the RF switch matrix 200 may include metal for such components to direct/contain/guide the RF waves (e.g., guide the input signal 106). The combiner 122 may comprise material comprising metamaterial. In some embodiments, the metamaterial used is not necessarily dependent on reflections to carry out specific electromagnetic functions (e.g., decoding a Hadamard code). For example, the combiner 122 may include a metamaterial that depends on refraction and/or path length reflections to carry out specific electromagnetic functions.

The system 100 may include a transmitter 112 coupled to the output ports 104, such as a transmitter configured to transmit the output signal 108 via one or more antennas. For example, the system 100 may include an antenna/lens 112. For instance, the system 100 may include a luneburg lens coupled to the output ports 104.

Figure 3A:
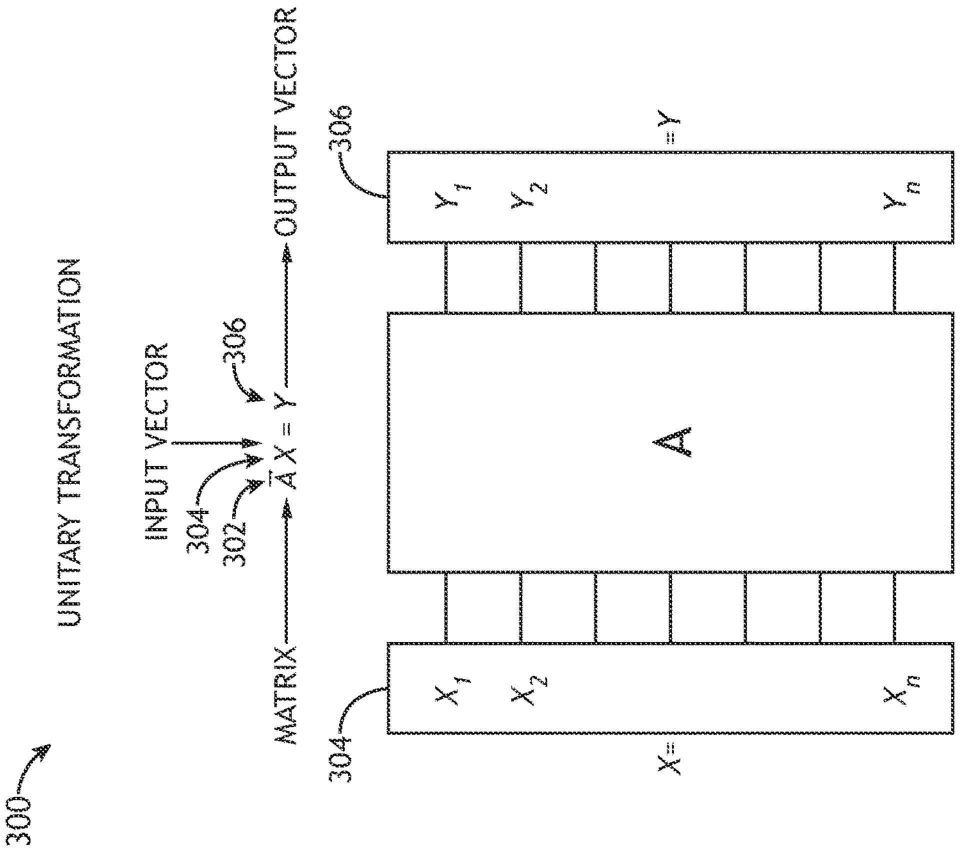
FIG. 3A is a view of a unitary transformation from input to output implementable by passive multi-port structures, in accordance with one or more embodiments of the present disclosure.
Figure 3C:
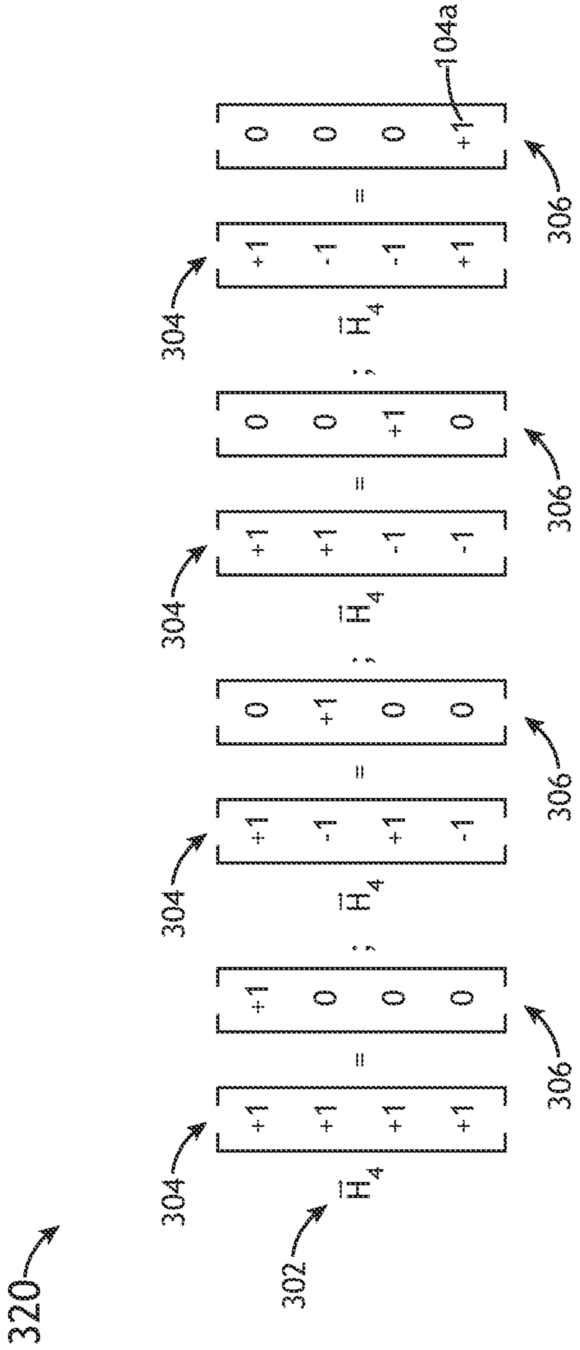
FIG. 3C is a view of a Hadamard transform with a change of basis based on the Hadamard matrix of FIG. 3B, in accordance with one or more embodiments of the present disclosure.

In embodiments, the code impressed by the phase shifters 118 includes a Hadamard code and the combiner 122 includes a Hadamard decoder configured to perform a Hadamard transform based on the Hadamard code. FIGS. 3A, 3B, and 3C illustrate one or more steps and/or elements of a transformation (e.g., unitary Hadamard transformation), in accordance with one or more embodiments of the present disclosure. Note that for purposes of clarity and brevity, normalization is ignored in FIGS. 3A, 3B, and 3C.

FIG. 3A illustrates a view 300 of a unitary transformation from input vector 304 to output vector 306 implementable by passive multi-port structures (e.g., a combiner 122 that is passive, multi-port), in accordance with one or more embodiments of the present disclosure. For example, the combiner 122 may perform a transformation of phase shift output signals (e.g., x vector 304) using a matrix 302 (e.g., Hadamard matrix 302) to generate/output an output vector 306 (e.g., beam port selection; 0010, 0000000000100000; and/or the like). For example, an input vector 304 may be the code impressed, and the output vector 306 may be a vector with only zeros except for a single "1" indicative of a selected output port 104*a*.

FIG. 3B illustrates a view 310 of a Hadamard matrix 302 (e.g., N=4 Hadamard matrix), in accordance with one or more embodiments of the present disclosure. The Hadamard matrix is configured to transform and decode the input vector 304 to generate/output the output vector 306.

FIG. 3C illustrates a view 320 of a Hadamard transform with a change of basis based on the Hadamard matrix of FIG. 3B, in accordance with one or more embodiments of the present disclosure. As shown, the input vectors 304 may be transformed using the same Hadamard matrix 302 to generate the corresponding, unique output vectors 306.

Referring back to FIG. 1, additional and/or alternative embodiments of the system 100 are described.

The RF matrix 200 may be at least one of: integrated onto a single chip; or implemented on a printed circuit board (PCB). For example, the RF matrix 200 may be a single chip. For example, the RF matrix 200 may be a printed circuit board (PCB) or include a PCB, a PCB may include the RF matrix 200, and/or the like.

The one or more processors 136 of controller 132 may include any one or more processing elements known in the art. In this sense, the one or more processors 136 may include any microprocessor device configured to execute algorithms and/or instructions. In one embodiment, the one or more processors 136 may consist of a desktop computer, mainframe computer system, workstation, image computer, parallel processor, or other computer system (e.g., networked computer) configured to execute a program configured to operate the system 100, as described throughout the present disclosure. It should be recognized that the steps described throughout the present disclosure may be carried out by a single computer system or, alternatively, multiple computer systems. In general, the term "processor" may be broadly defined to encompass any device having one or more processing elements, which execute program instructions from a non-transitory memory medium (e.g., memory 134). Moreover, different subsystems of the system 100 may include processor or logic elements suitable for carrying out at least a portion of the steps described throughout the present disclosure. Therefore, the above description should not be interpreted as a limitation on the present invention but merely an illustration.

The memory medium 134 may include any storage medium known in the art suitable for storing program instructions executable by the associated one or more processors 136. For example, the memory medium 134 may include a non-transitory memory medium. For instance, the memory medium 134 may include, but is not limited to, a read-only memory, a random access memory, a magnetic or optical memory device (e.g., disk), a magnetic tape, a solid state drive and the like. In another embodiment, it is noted herein that the memory 134 is configured to store one or more results from the system 100 and/or the output of the various steps described herein. It is further noted that memory 134 may be housed in a common controller housing with the one or more processors 136. In an alternative embodiment, the memory 134 may be located remotely with respect to the physical location of the processors and controller 132. For instance, the one or more processors 136 of controller 132 may access a remote memory (e.g., server), accessible through a network (e.g., internet, intranet and the like). In another embodiment, the memory medium 134 stores the program instructions for causing the one or more processors 136 to carry out the various steps described through the present disclosure.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

In another embodiment, the controller 132 of the system 100 may be configured to receive and/or acquire data or information from other systems by a transmission medium that may include wireline and/or wireless portions. In another embodiment, the controller 132 of the system 100 may be configured to transmit data or information (e.g., the output of one or more processes disclosed herein) to one or more systems or sub-systems by a transmission medium that may include wireline and/or wireless portions. In this manner, the transmission medium may serve as a data link between the controller 132 and other subsystems of the system 100. Moreover, the controller 132 may send data to external systems via a transmission medium (e.g., network connection).

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "in embodiments", "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for radio frequency (RF) switching comprising:

one or more input ports configured to receive an input signal and two or more output ports; and an RF switch matrix coupled between the one or more input ports and the two or more output ports and configured to selectively couple one or more of the one or more input ports to one or more selected output ports of the two or more output ports, wherein the RF switch matrix comprises:

a power divider coupled to the one or more input ports and configured to split the input signal into a plurality of power divider output signals;

a plurality of phase shifters coupled to the power divider and configured to output a plurality of phase shift output signals, wherein each phase shifter is configured to receive a power divider output signal and output a phase shift output signal; and a combiner coupled to the plurality of phase shifters and comprising combiner input ports and coupled to the two or more output ports, the combiner configured to receive the plurality of phase shift output signals via the combiner input ports and to selectively output an output signal via the one or more selected output ports of the two or more output ports, wherein the plurality of phase shifters are configured to be selectively activated to perform a phase shift to the plurality of phase shift output signals.

2. The system of claim 1, wherein the outputting of the plurality of phase shift output signals is configured to impress a code on the plurality of phase shift output signals, wherein the code is configured to uniquely correspond to the one or more selected output ports, wherein the selective outputting of the output signal via the one or more selected output ports is based on the code.

3. The system of claim 2, wherein the code is configured to be impressed by a set of control signals via a set of control lines coupled to the plurality of phase shifters.

4. The system of claim 2, wherein the plurality of phase shifters comprise a plurality of binary phase shifters, each binary phase shifter configured to selectively perform an electronically controlled polarization rotation corresponding to a 180 degree phase rotation, wherein the impressing of the code comprises the selective performing of the electronically controlled polarization rotation.

5. The system of claim 2, wherein the one or more selected output ports comprises a single selected output port, wherein the combiner is configured to focus the plurality of phase shift output signals to the single selected output port based on the code.

6. The system of claim 2, wherein the code comprises a Hadamard code and the combiner comprises a Hadamard decoder configured to perform a Hadamard transform based on the Hadamard code.

7. The system of claim 2, wherein the combiner is passive such that the selective outputting of the output signal is passively selected based on the code.

8. The system of claim 1, wherein the one or more of the one or more input ports of the RF switch matrix comprises a single input port, and the one or more selected output ports of the two or more output ports of the RF switch matrix comprises a single selected output port of the two or more output ports.

9. The system of claim 1, wherein the system comprises a waveguide implementation of the RF switch matrix, the one or more input ports, and the two or more output ports.

10. The system of claim 1, wherein the RF switch matrix is at least one of: integrated onto a single chip; or implemented on a printed circuit board (PCB).

11. The system of claim 1, further comprising a luneburg lens coupled to the two or more output ports.

12. The system of claim 1, wherein the plurality of the power divider output signals are configured to have equal amplitude and phase.

13. A system for radio frequency (RF) switching comprising:

a controller configured to execute program instructions stored on memory, the memory comprising a code;

one or more input ports configured to receive an input signal and two or more output ports; and an RF switch matrix coupled to the controller via a set of control lines, the controller coupled between the one or more input ports and the two or more output ports and configured to selectively couple one or more of the one or more input ports to one or more selected output ports of the two or more output ports, wherein the RF switch matrix comprises:

a power divider coupled to the one or more input ports and configured to split the input signal into a plurality of power divider output signals;

a plurality of phase shifters coupled to the power divider and configured to output a plurality of phase shift output signals, wherein each phase shifter is configured to receive a power divider output signal and output a phase shift output signal; and a combiner coupled to the plurality of phase shifters and comprising combiner input ports and coupled to the two or more output ports, the combiner configured to receive the plurality of phase shift output signals via the combiner input ports and to selectively output an output signal via the one or more selected output ports of the two or more output ports, wherein the plurality of phase shifters are configured to be selectively activated to perform a phase shift to the plurality of phase shift output signals.

14. The system of claim 13, wherein the outputting of the plurality of phase shift output signals is configured to impress a code on the plurality of phase shift output signals, wherein the code is selected from a plurality of codes, wherein each code of the plurality of codes is configured to uniquely correspond to the one or more selected output ports, wherein the selective outputting of the output signal via the one or more selected output ports is based on the code.

15. The system of claim 14, wherein the code is configured to be impressed by a set of control signals via the set of control lines coupled to the plurality of phase shifters.

16. The system of claim 14, wherein the plurality of phase shifters comprise a plurality of binary phase shifters, each binary phase shifter configured to selectively perform an electronically controlled polarization rotation corresponding to a 180 degree phase rotation, wherein the impressing of the code comprises the selective performing of the electronically controlled polarization rotation.

17. The system of claim 14, wherein the one or more selected output ports comprises a single selected output port, wherein the combiner is configured to focus the plurality of phase shift output signals to the single selected output port based on the code.

18. The system of claim 14, wherein the code comprises a Hadamard code and the combiner comprises a Hadamard decoder configured to perform a Hadamard transform based on the Hadamard code.

19. The system of claim 14, wherein the combiner is passive such that the selective outputting of the output signal is passively selected based on the code.

20. The system of claim 13, wherein the system comprises a waveguide implementation of the RF switch matrix, the one or more input ports, and the two or more output ports.

* * * * *